US009122376B1

(12) United States Patent
Brotherston et al.

(10) Patent No.: US 9,122,376 B1
(45) Date of Patent: Sep. 1, 2015

(54) SYSTEM FOR IMPROVING AUTOCOMPLETION OF TEXT INPUT

(71) Applicant: Google Inc., Mountain View, CA (US)

(72) Inventors: Daniel Scott Brotherston, Kitchener (CA); Jason Patrick Parachoniak, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/865,975

(22) Filed: Apr. 18, 2013

(51) Int. Cl.
*G06F 3/048* (2013.01)
*G06F 3/0482* (2013.01)
*G06F 17/27* (2006.01)
*G06F 17/30* (2006.01)
*G06F 3/0484* (2013.01)

(52) U.S. Cl.
CPC ............ *G06F 3/0482* (2013.01); *G06F 17/273* (2013.01); *G06F 17/276* (2013.01); *G06F 17/3064* (2013.01); *G06F 17/30637* (2013.01); *G06F 3/0484* (2013.01); *G06F 17/30* (2013.01); *G06F 17/3097* (2013.01); *G06F 17/30616* (2013.01)

(58) Field of Classification Search
CPC ... G06F 17/30; G06F 17/273; G06F 17/3097; G06F 17/3064; G06F 17/30616; G06F 17/30637; G06F 17/276; G06F 3/0484; G06F 3/0482; G06F 9/4443
USPC .................................. 715/810, 780, 773, 816
See application file for complete search history.

(56) References Cited

U.S. PATENT DOCUMENTS

| | | | | | |
|---|---|---|---|---|---|
| 5,621,903 | A | * | 4/1997 | Luciw et al. | 715/708 |
| 5,711,624 | A | * | 1/1998 | Klauber | 400/486 |
| 5,761,689 | A | * | 6/1998 | Rayson et al. | 715/210 |
| 5,845,300 | A | * | 12/1998 | Comer et al. | 715/203 |
| 6,286,064 | B1 | * | 9/2001 | King et al. | 710/67 |
| 6,292,179 | B1 | | 9/2001 | Lee | |
| 6,307,549 | B1 | * | 10/2001 | King et al. | 715/810 |

(Continued)

FOREIGN PATENT DOCUMENTS

WO WO 01/50335 A1 * 7/2001 ............. G06F 17/21

OTHER PUBLICATIONS

U.S. Appl. No. 60/430,338, by Daniel Suraqui, filed Nov. 29, 2002.

(Continued)

*Primary Examiner* — Ajay Bhatia
*Assistant Examiner* — Jennifer Nichols
(74) *Attorney, Agent, or Firm* — Shumaker & Sieffert, P.A.

(57) ABSTRACT

In one example a computing device receives a first indication of at least one user input to select one or more textual characters. The computing device determines a plurality of auto-complete word suggestions based at least in part on the one or more textual characters and outputs for display, based at least in part on the one or more textual characters, a first auto-complete word suggestion of the plurality of auto-complete word suggestions. In addition, the computing device receives a second indication of the at least one user input that indicates the first auto-complete word suggestion is incorrect. Responsive to receiving the second indication, the computing device outputs for display a second auto-complete word suggestion of the plurality of auto-complete word suggestions to replace the first auto-complete word suggestion. The first auto-complete word suggestion is more likely to be a correct word suggestion than the second-autocomplete word suggestion.

17 Claims, 5 Drawing Sheets

(56) References Cited

U.S. PATENT DOCUMENTS

| | | | |
|---|---|---|---|
| 6,377,965 B1* | 4/2002 | Hachamovitch et al. | 715/203 |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,181,497 B1 | 2/2007 | Appelman et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,508,324 B2 | 3/2009 | Suraqui | |
| 7,634,741 B2* | 12/2009 | Klein | 715/811 |
| 7,698,127 B2* | 4/2010 | Trower, II et al. | 704/9 |
| 7,706,616 B2 | 4/2010 | Kristensson et al. | |
| 7,716,579 B2 | 5/2010 | Gunn et al. | |
| 7,750,891 B2 | 7/2010 | Stephanick et al. | |
| 7,793,228 B2* | 9/2010 | Mansfield et al. | 715/780 |
| 7,818,718 B2* | 10/2010 | Wedel et al. | 717/110 |
| 7,921,361 B2 | 4/2011 | Gunn et al. | |
| 7,958,490 B2* | 6/2011 | Foti | 717/113 |
| 8,036,878 B2* | 10/2011 | Assadollahi | 704/10 |
| 8,135,582 B2 | 3/2012 | Suraqui | |
| 8,266,528 B1* | 9/2012 | Hayes | 715/256 |
| 8,290,772 B1* | 10/2012 | Cohen et al. | 704/235 |
| 8,332,748 B1* | 12/2012 | Karam | 715/246 |
| 8,370,143 B1* | 2/2013 | Coker | 704/240 |
| 8,539,024 B2* | 9/2013 | Smit et al. | 709/203 |
| 8,612,213 B1* | 12/2013 | Zhai et al. | 704/9 |
| 8,712,931 B1* | 4/2014 | Wahlen | 706/12 |
| 2004/0003335 A1* | 1/2004 | Gertz et al. | 714/758 |
| 2004/0006764 A1* | 1/2004 | Van De Vanter et al. | 717/112 |
| 2004/0163032 A1* | 8/2004 | Guo et al. | 715/500 |
| 2005/0223308 A1* | 10/2005 | Gunn et al. | 715/500 |
| 2006/0119582 A1 | 6/2006 | Ng et al. | |
| 2006/0176283 A1 | 8/2006 | Suraqui | |
| 2006/0218088 A1* | 9/2006 | Flora et al. | 705/39 |
| 2006/0241944 A1* | 10/2006 | Potter et al. | 704/254 |
| 2006/0253427 A1* | 11/2006 | Wu et al. | 707/3 |
| 2006/0265208 A1* | 11/2006 | Assadollahi | 704/9 |
| 2007/0013650 A1* | 1/2007 | Ladouceur | 345/156 |
| 2007/0296615 A1* | 12/2007 | Raguseo | 341/51 |
| 2008/0037733 A1* | 2/2008 | Chen et al. | 379/88.22 |
| 2008/0189605 A1* | 8/2008 | Kay et al. | 715/257 |
| 2008/0266261 A1* | 10/2008 | Idzik | 345/168 |
| 2008/0316183 A1 | 12/2008 | Westerman et al. | |
| 2009/0146848 A1* | 6/2009 | Ghassabian | 341/22 |
| 2009/0193332 A1* | 7/2009 | Lee | 715/256 |
| 2009/0228439 A1* | 9/2009 | Manolescu et al. | 707/3 |
| 2009/0254818 A1* | 10/2009 | Jania et al. | 715/257 |
| 2010/0036747 A1* | 2/2010 | Bagley et al. | 705/26 |
| 2010/0070908 A1* | 3/2010 | Mori et al. | 715/773 |
| 2010/0087185 A1* | 4/2010 | Hawkins et al. | 455/422.1 |
| 2010/0315266 A1* | 12/2010 | Gunawardana et al. | 341/22 |
| 2011/0060984 A1* | 3/2011 | Lee | 715/261 |
| 2011/0061017 A1* | 3/2011 | Ullrich et al. | 715/780 |
| 2011/0154193 A1* | 6/2011 | Creutz et al. | 715/261 |
| 2011/0202836 A1* | 8/2011 | Badger et al. | 715/702 |
| 2012/0036469 A1 | 2/2012 | Suraqui | |
| 2012/0131547 A1* | 5/2012 | Muir | 717/109 |
| 2012/0159317 A1* | 6/2012 | Di Cocco et al. | 715/261 |
| 2012/0185498 A1* | 7/2012 | Loofbourrow et al. | 707/767 |
| 2012/0259615 A1* | 10/2012 | Morin et al. | 704/9 |
| 2012/0311439 A1* | 12/2012 | Yang et al. | 715/271 |
| 2013/0246329 A1* | 9/2013 | Pasquero et al. | 706/52 |
| 2014/0104175 A1* | 4/2014 | Ouyang et al. | 345/168 |
| 2014/0108925 A1* | 4/2014 | Zhai et al. | 715/271 |

OTHER PUBLICATIONS

U.S. Appl. No. 60/505,724, by Daniel Suraqui, filed Sep. 22, 2003.

* cited by examiner

SYSTEM FOR IMPROVING AUTOCOMPLETION OF TEXT INPUT

BACKGROUND

Some computing devices (e.g., mobile phones, tablet computers, etc.) may provide a graphical keyboard as part of a graphical user interface for composing text using a presence-sensitive input device (e.g., a track pad or presence-sensitive display device (such as a touchscreen)). The graphical keyboard may enable a user of the computing device to enter text (e.g., an e-mail, a text message, or a document, etc.). For instance, a presence-sensitive input device of a computing device may output a graphical (or "soft") keyboard that enables the user to enter data by indicating (e.g., by tapping) keys displayed at the presence-sensitive input device.

In some examples, a computing device that provides a graphical keyboard may rely on auto-completion systems to correct spelling and grammar errors within user-entered text and/or to complete partially-typed words within user-entered text. However, some auto-completion systems may have certain drawbacks. For instance, some auto-completion system may make automatic corrections and/or completions to replace user-entered text with one or more words inconsistent with the user's intended text. Consequently, a user may need to perform additional effort to remove, delete, or otherwise correct an erroneous automatic-completion.

SUMMARY

In one example, a method includes receiving, by a computing device, a first indication of at least one user input to select one or more textual characters. The method further includes determining, by the computing device, a plurality of auto-complete word suggestions based at least in part on the one or more textual characters, and outputting, by the computing device and for display, based at least in part on the one or more textual characters, a first auto-complete word suggestion of the plurality of auto-complete word suggestions. The method further includes receiving, by the computing device, a second indication of the at least one user input that indicates the first auto-complete word suggestion is incorrect. Responsive to receiving the second indication, the method further includes outputting, by the computing device and for display, a second auto-complete word suggestion of the plurality of auto-complete word suggestions to replace the first auto-complete word suggestion, wherein the first auto-complete word suggestion is more likely to be a correct word suggestion than the second-autocomplete word suggestion.

In another example, a computer-readable storage medium is encoded with instructions that, when executed, cause at least one processor of a computing device to receive, by the computing device, a first indication of at least one user input to select one or more textual characters. The computer-readable storage medium is further encoded with instructions that, when executed, cause the at least one processor to determine, by the computing device, a plurality of auto-complete word suggestions based at least in part on the one or more textual characters and output, by the computing device and for display, based at least in part on the one or more textual characters, a first auto-complete word suggestion of the plurality of auto-complete word suggestions. The computer-readable storage medium is further encoded with instructions that, when executed, cause the at least one processor to receive, by the computing device, a second indication of the at least one user input that indicates the first auto-complete word suggestion is incorrect. The computer-readable storage medium is further encoded with instructions that, when executed, cause the at least one processor to, responsive to receiving the second indication, output, by the computing device and for display, a second auto-complete word suggestion of the plurality of auto-complete word suggestions to replace the first auto-complete word suggestion, wherein the first auto-complete word suggestion is more likely to be a correct word suggestion than the second-autocomplete word suggestion.

In another example, a computing system includes at least one processor, a presence-sensitive input device and a display device each operatively coupled to the at least one processor, and at least one module operable by the at least one processor to receive, by the computing system and at the presence-sensitive device, a first indication of at least one user input to select one or more textual characters. The at least one module operable by the at least one processor is further configured to determine, by the computing system, a plurality of auto-complete word suggestions based at least in part on the one or more textual characters, and output, by the computing system and for display at the display device, based at least in part on the one or more textual characters, a first auto-complete word suggestion of the plurality of auto-complete word suggestions. The at least one module operable by the at least one processor is further configured to receive, by the computing system and at the presence-sensitive input device, a second indication of the at least one user input that indicates the first auto-complete word suggestion is incorrect, and responsive to receiving the second indication, output, by the computing system and for display at the display device, a second auto-complete word suggestion of the plurality of auto-complete word suggestions to replace the first auto-complete word suggestion, wherein the first auto-complete word suggestion is more likely to be a correct word suggestion than the second-auto complete word suggestion.

The details of one or more examples of the disclosure are set forth in the accompanying drawings and the description below. Other features, objects, and advantages will be apparent from the description and drawings, and from the claims.

DETAILED DESCRIPTION

Figure 1:
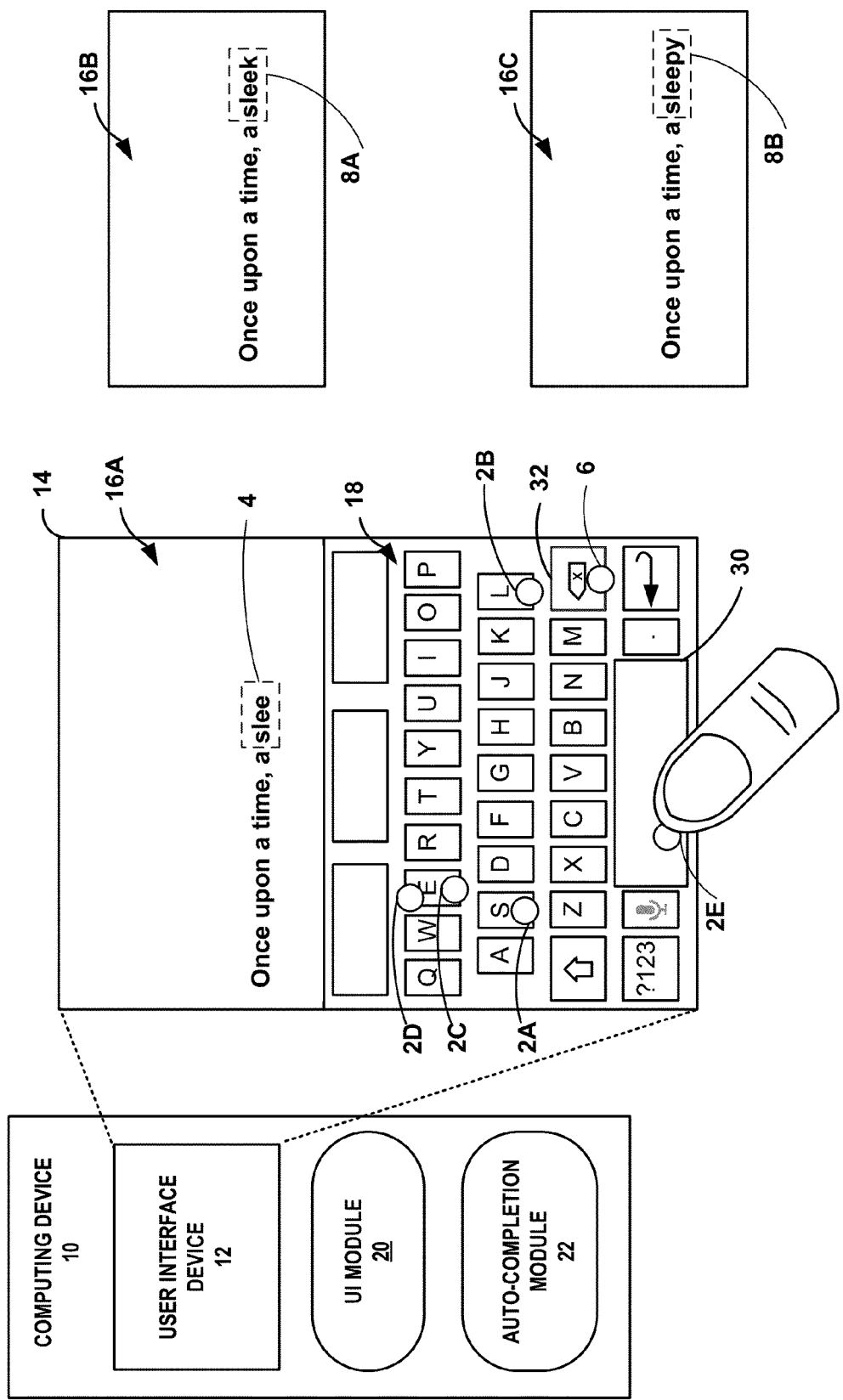
FIG. 1 is a conceptual diagram illustrating an example computing device that is configured to replace an incorrect auto-completed word with a next most-probable auto-completed word, in accordance with one or more techniques of this disclosure.

In general, this disclosure is directed to techniques for improved auto-completion of words. In some examples, a computing device may receive one or more indications of input to select one or more keys of a keyboard. Responsive to receiving the indications, the computing device may utilize a language model to determine one or more auto-complete word suggestions. For instance, the computing device may determine a probability that a string of characters corresponding to one or more selected keys is included in or is a misspelling of at least one of the auto-complete word suggestions. The computing device may rank each auto-complete word suggestion based on a probability that the auto-complete word suggestion is the word actually intended by the user. If the probability satisfies or exceeds a threshold, the computing device may output a first auto-complete word suggestion to autocomplete and/or autocorrect the string of characters corresponding to the user input. For instance, the computing device may receive an indication of input to select a portion of a word (e.g., a prefix of characters) and a space character, and upon receiving the indication, the computing device may output a first-autocomplete word suggestion (e.g., a word associated with a highest probability) for display.

In some examples, after outputting the first auto-complete word suggestion, the computing device may receive an indication of input that causes the computing device to output a next auto-complete word suggestion to replace the first auto-complete word suggestion. For instance, the computing device may determine that a selection of the backspace key following the auto-completion of the first auto-complete word and the space character, indicates that the first auto-complete word suggestion is incorrect. That is, the backspace key following the auto-completion and the spacebar key may indicate the user actually intended the autocompleted word to be a word that is different than the first auto-complete word. In accordance with techniques of the disclosure, responsive to receiving an indication that the first auto-complete word suggestion is incorrect, the computing device may replace the first auto-complete word suggestion with the next auto-complete word suggestion. In some examples, the next auto-complete word suggestion may be the next most probable word following the first auto complete word suggestion. Said differently, if a user presses the backspace immediately after the space key when the computing device has autocompleted and/or autocorrected a word, the computing device may determine that the previous word (e.g., the first auto-complete word suggestion) is incorrect and the computing device may replace the previous word with the next most likely autocomplete suggestion.

In this way the computing device may more efficiently generate text based on user input than other devices that use conventional auto-completion techniques. Consequently, techniques of the disclosure may improve the ease of correcting auto-complete word suggestions presented by the computing device upon performing an auto-completion and/or auto-correction. As such, a user of the computing device may spend less time typing and fixing auto-completion errors than a user of other devices. By enabling more efficient text input the computing device may perform fewer operations to process and generate text from a user input, and thus consume less processing power than other computing devices.

FIG. 1 is a conceptual diagram illustrating an example computing device 10 that is configured to replace an incorrect auto-completed word with a next most-probable auto-completed word, in accordance with one or more techniques of this disclosure. In the example of FIG. 1, computing device 10 may be a mobile phone. However, in other examples, computing device 10 may be a tablet computer, a personal digital assistant (PDA), a laptop computer, a portable gaming device, a portable media player, an e-book reader, a watch, television platform, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may be or may include a presence-sensitive screen that may receive tactile user input from a user of computing device 10. UID 12 may receive indications of the tactile user input by detecting one or more tap and/or non-tap gestures from a user of computing device 10 (e.g., the user touching or pointing to one or more locations of UID 12 with a finger or a stylus pen). UID 12 may present output to a user as a user interface (e.g., user interface 14) which may be related to functionality provided by computing device 10. For example, UID 12 may present various user interfaces of applications (e.g., an electronic message application, an Internet browser application, etc.) executing at computing device 10. A user of computing device 10 may interact with one or more of these applications to perform a function with computing device 10 through the respective user interface of each application.

Computing device 10 may include user interface ("UI") module 20 and auto-completion ("AC") module 22. Modules 20 and 22 may perform operations described using software, hardware, firmware, or a mixture of both hardware, software, and firmware residing in and executing on computing device 10. Computing device 10 may execute modules 20 and 22 with multiple processors. Computing device 10 may execute modules 20 and 22 as a virtual machine executing on underlying hardware.

UI module 20 may cause UID 12 to present user interface 14. User interface 14 includes graphical elements displayed at various locations of UID 12. FIG. 1 illustrates edit region 16A of user interface 14, and graphical keyboard 18 of user interface 14. Edit region 16A may include graphical elements such as images, objects, hyperlinks, characters of text, etc. Graphical keyboard 18 includes graphical elements displayed as keys (e.g., spacebar key 30 and backspace key 32). In the example of FIG. 1, edit region 16A includes graphical elements displayed as user-entered characters of text (e.g., one or more words). A user of computing device 10 may enter text in edit region 16A by providing user input at locations of UID 12 that present the keys of graphical keyboard 18.

UI module 20 may act as an intermediary between various components of computing device 10 to make determinations based on input detected by an input device of computing device 10 (e.g., UID 12) and generate output presented by an output device of computing device 10 (e.g., UID 12). In one example, UI module 20 may receive information from UID 12 about an indication of a user input detected at UID 12 as a user interacts with user interface 14.

UI module 20 may determine, based on the information associated with the input, a modification to user interface 14 and send information to UID 12 that causes UID 12 to modify the presentation of user interface 14 at UID 12. For instance, UI module 20 may include information about the layout of the keys included in graphical keyboard 18. UI module 20 may utilize the layout information to command UID 12 to present the keys of graphical keyboard 18 at particular locations of the presence-sensitive screen. As UID 12 presents graphical keyboard 18 at the presence-sensitive screen, UI module 20 may receive information from UID 12 about user input detected at UID 12. UI module 20 may determine a sequence of touch events based on the information. For instance, each touch event in the sequence may include data about where, when, and from what direction at UID 12 that UID 12 detected user input.

UI module 20 may determine, based on the sequence of touch events, that the one or more touch events approximate a selection of one or more keys (e.g., UI module 20 may determine the location of one or more of the touch events corresponds to an area of UID 12 that presents one or more keys of graphical keyboard 18). UI module 20 may determine a selection of one or more keys based on the key locations and the one or more touch events. For instance, UI module 20 may utilize a spatial model to determine a probability that one or more touch events corresponds to a selection of a key of graphical keyboard 18.

UI module 20 may include the keys with the highest spatial model probabilities in a sequence of keys. UI module 20 may generate a character string based on the sequence of keys and include the character string within edit region 16A of user interface 14. For example, UI module 20 may determine a sequence of touch events represents a selection of the <S-key>, the <L-key>, the <E-key>, and again the <E-key> and based on the selection, generate a key sequence. Based on the key sequence, UI module 20 may generate a sequence of characters having one character in the sequence corresponding to each key in the sequence. UI module 20 may generate a sequence of characters, e.g., a character string, based on the key sequence above corresponding to slee. UI module 20 may modify user interface 14 by including the character string slee within edit region 16A. UI module 20 may cause UID 12 to present the updated user interface 14 which includes the character string generated based on the user input.

Although shown as utilizing graphical keyboard 18, UID 12 may include a physical keyboard or other input device for entering character input. For instance, instead of or in addition to graphical keyboard 18, UID 12 may include a physical QWERTY keyboard (not shown). UI module 20 may generate one or more character strings for inclusion in edit region 16A based on input detected at the physical keyboard by UID 12.

AC module 22 of computing device 10 may perform character string auto-completion. AC module 22 may receive as input (e.g., from UI module 20) a character string and transmit as output (e.g., to UI module 20) one or more auto-complete word suggestions. For example, UI module 20 may determine the character string slee based on information corresponding to user input detected by UID 12. UI module 20 may determine the character string based on the raw sequence of keys and associated raw sequence of characters that represent the sequence of keys. In other words, UI module 20 may generate the character string slee based on the sequence of keys and the individual character representations of the keys. To ensure UI module 20 includes the intended character string in edit region 16A, UI module 20 may transmit the raw character string to AC module 22. AC module 22 may determine one or more auto-complete word suggestions, which AC module 22 sends to UI module 20. Each of the one or more auto-complete word suggestions may represent an auto-completed arrangement of characters that the user may have intended to enter with a user input. UI module 20 may output one of the auto-complete word suggestions for display in edit region 16A. In some examples, the output of the auto-complete word suggestion replaces the word generated from the raw character string within edit region 16A.

In some examples, AC module 22 may utilize a word-level n-gram language model to determine the one or more auto-complete word suggestions based on the raw character string received from UI module 20. In general, a word-level n-gram language model assigns a probability to a word appearing subsequent to, previous to, and/or within a sequence of words. For instance, a tri-gram language model may assign a probability to the word sleepy appearing subsequent to a sequence of words time, a. The n-gram language model of AC module 22 may determine the one or more words in the lexicon that have the highest probabilities and AC module 22 may determine these highest probability words represent the one or more auto-complete word suggestions.

In some examples, AC module 22 may rely on a similarity coefficient (e.g., a Jaccard similarity coefficient) to determine one or more auto-complete word suggestions in the lexicon. For example, a lexicon of computing device 10 may include a list of words within a written language vocabulary. AC module 22 may perform a lookup in the lexicon, of the raw character string, to identify one or more auto-complete word suggestions that include parts or all of the characters of the raw character string. The lexicon may assign a Jaccard similarity coefficient to each word in the lexicon. The Jaccard similarity coefficient may represent a numerical value indicating how close the raw character string matches the auto-complete word suggestion in the lexicon. In other words, the one or more auto-complete word suggestions may represent alternative spellings or arrangements of the characters in the raw character string based on a comparison with words within the lexicon. AC module 22 may determine that the auto-complete word suggestion with the highest Jaccard similarity coefficient represents the auto-completed character string that AC module 22 outputs to UI module 20 for inclusion in edit region 16A.

In some examples, the auto-complete word suggestion with the highest language model probability and/or highest Jaccard similarity coefficient may match the raw character string generated by UI module 20 from the raw key sequence (e.g., the lexicon may return a word that matches the raw character string as the highest ranking auto-complete word suggestion if the arrangement of the characters in the raw character string correspond to a character string in the lexicon). In any event, whether AC module 22 utilizes a language model or techniques that utilize a Jaccard similarity coefficient, AC module 22 may rank the one or more auto-complete word suggestions in order with the highest ranked auto-complete word suggestion representing the most likely user-intended word. AC module 22 may output the ranked one or more auto-complete word suggestions to UI module 20, from which UI module 20 may include the highest ranked, the next highest ranked, etc. auto-complete word suggestion in user interface 14.

Rather than requiring the user to provide a multiple inputs to complete a word and/or change an auto-completed word to a different auto-completed word, the user can simply provide an indication that the word is incorrect (e.g., with a single backspace key selection), in which case the computing device replaces first auto-completed word with a second slightly less probable word. In this way, a user can enter text (e.g., a prefix of a word, an entire word, a misspelled word, etc.) and if the system auto-completes or auto-corrects the user-text to a highly probable word that, however, is unintended by the user, the user can provide this indication to the computing device that the word is incorrect. In response to the indication, the computing device can select and use instead, the next most probable word, which statistically, is highly likely to be the word that the user intended, to auto-complete and/or auto-correct the user-text.

The techniques are now further described in detail with reference to FIG. 1. In the example of FIG. 1, computing device 10 may receive, at an input device, a first indication of at least one user input to select one or more textual characters. For example, a user that interacts with user interface 14 may tap at locations of UID 12 that present individual keys of graphical keyboard 18. FIG. 1 illustrates multiple tap locations 2A-2E (collectively tap locations 2) of UID 12 where the first indication of the at least one user input is detected. For example, tap location 2A represents a first location of UID 12 where UID 12 detects the first indication of the at least one user input (e.g., a first finger tap), tap location 2B represents a second location of UID 12 where UID 12 detects the first indication of the at least one user input (e.g., a second finger tap), tap location 2C represents a third location of UID 12 where UID 12 detects the first indication of the at least one user input (e.g., a third finger tap), etc. Each of tap locations 2 are delimited by empty circles in FIG. 1 for example purposes, although UID 12 may not output such empty circles in some examples, and such tap locations 2 may be larger and/or smaller in various different examples.

UI module 20 may receive information from UID 12 about the at least one user input detected at tap locations 2 of UID 12. UI module 20 may determine a sequence of touch events based on the information. In other words, each touch event in the sequence of touch events may include data about where, when, and from what direction at UID 12 that UID 12 detected the at least one user input. In one example, the sequence of touch events includes five touch events that each have a location component and a time component. The location component of the first touch event in the sequence may correspond to tap location 2A, and the time component of the first touch event in the sequence may correspond to when UID 12 detected the at least one user input at tap location 2A. The location components of the second, third, fourth, and fifth touch events in the sequence may correspond respectively to tap locations 2B, 2C, 2D, and 2E, and the time components of these touch events may correspond to when UID 12 detected the at least one user input at tap locations 2B, 2C, 2D, and 2E respectively.

Based on the sequence of touch events, UI module 20 may determine a sequence of key selections. For instance, UI module 20 may determine a key of graphical keyboard 18 that shares a location of UID 12 with one or more touch events in the sequence of touch events. UI module 20 may determine the sequence of touch events corresponds to a selection of a sequence of keys including (in order of first to last) the <S-key>, the <L-key>, the <E-key>, again the <E-key>, and spacebar key 30. UI module 20 may determine one or more character strings based on the sequence of keys.

UI module 20 may identify one or more keys in the sequence of keys that represent an end of character string identifier. For instance, UI module 20 may determine that when a selection of spacebar key 30 or a key corresponding to a punctuation mark appears in a sequence of keys that this spacebar or punctuation key selection corresponds to an end of a word (e.g., an end of character string) identifier. UI module 20 may determine the keys that appear prior to an end of character string identifier in the sequence of keys correspond to a character string.

UI module 20 may generate a raw character string slee based on the selection of keys that appear prior to the selection of spacebar key 30 in the sequence of keys. For example, the selection of spacebar key 30 may indicate an end of character string. UI module 20 may associate each key in the sequence of keys that appear prior to the selection of spacebar key 30 correspond to individual characters s-l-e-e and generate raw character string 4. In some examples, UI module 20 may output raw character string 4 along with a command to update the presentation of user interface 14 to UID 12 which causes UID 12 to present character string 4 within edit region 16A. In some examples, UI module 20 does not output raw character string 4 to UID 12 and instead computing device 10 makes further determinations based on raw character string 4 and the at least one user input.

Computing device 10 may determine a plurality of auto-complete word suggestions based at least in part on the one or more textual characters. For example, in conjunction with UI module 20 outputting raw character string 4 to UID 12, UI module 20 may output raw character string 4 to AC module 22 to determine a plurality of auto-complete word suggestions based at least in part on the one or more textual characters that make up raw character string 4. AC module 22 may receive raw character string 4 from UI module 20 and determine one or more auto-complete word suggestions based on raw character string 4. For example, using a word-level n-gram language model and/or techniques that utilize a Jaccard similarity coefficient, AC module 22 may determine one or more auto-complete word suggestions from a lexicon that may represent character input that the user may have intended to enter with the at least one user input detected at UID 12. AC module 22 may determine the auto-complete word suggestions sleek and sleepy represent a highest and a next highest ranked auto-complete word suggestion for character string 4. AC module 22 may output the auto-complete word suggestions sleek and sleepy and the respective ranking of these auto-complete word suggestions, to UI module 20.

Computing device 10 may output for display, based at least in part on the one or more textual characters, a first auto-complete word suggestion 8A of the plurality of auto-complete word suggestions. In some examples, first auto-complete word suggestion 8A is the most probable word in the plurality of auto-complete word suggestions. In other words, UI module 20 may receive the auto-complete word suggestions sleek and sleepy along with an associated ranking of the auto-complete word suggestions (e.g., the ranking according to the language model probability and/or Jaccard similarity coefficient associated with each word which indicates which auto-complete word suggestion is more likely a user intended word) from AC module 22. UI module 20 may include the highest ranking auto-complete word suggestion sleek (e.g., first auto-complete word suggestion 8A) in user interface 14. In some examples, including first auto-complete word suggestions 8A in user interface 14 replaces raw character string 4. In any event, after updating user interface 14, UI module 20 may cause UID 12 to update the presentation of user interface 14. FIG. 1 illustrates that UI module 20 may cause UID 12 to output first auto-complete word suggestion 8A for display within edit region 16B in place of raw character string.

In some examples, the highest ranking auto-complete word suggestion determined by AC module 22 may not actually represent the word the user intended to enter with the at least one user input. To replace the highest-ranking auto-complete word suggestion with a different auto complete word suggestion (e.g., the next highest-ranked auto-complete word suggestion), the user may provide an additional input. For instance, computing device 10 may receive, at the input device, a second indication of the at least one user input that indicates the first auto-complete word suggestion is incorrect. In other words, UID 12 may detect a second indication of the at least one user input at UID 12. UI module 20 may receive information about the second indication of the at least one user input and determine a second sequence of touch events associated with the at least one user input. The second sequence of touch events may include one or more touch events associated with a location of UID 12 where UID 12 presents backspace key 32 of graphical keyboard 18. UI module 20 may determine the second indication of the at least one user input represents a selection of backspace key 32. In some examples, the second indication of the at least one user input comprises a representation of a selection of one of or both of a spacebar key and a backspace key. In other words, the second indication may represent a selection of spacebar key 30, backspace key 32, or a combination of both spacebar key 30 and backspace key 32. In other examples, the second indication may represent selections of other control keys and/or combinations of control keys. In some examples, the second indication represents a single tap gesture of a control key (e.g., backspace key 32) at a graphical keyboard. Still in further examples, the second indication represents a selection of one or more control keys received from a physical keyboard. In any event, UI module 20 may determine based on the second indication, that a selection of backspace key 32 which follows the output of first auto-completed word suggestion 8A represents an indication from the user that the first auto-complete word suggestion is incorrect.

Responsive to receiving the second indication, computing device 10 may output, for display at an output device, a second auto-complete word suggestion of the plurality of auto-complete word suggestions to replace the first auto-complete word suggestion. The first auto-complete word suggestion may be more probable than the second-autocomplete word suggestion. In other words, as described above, UI module 20 may receive two or more auto-complete word suggestions from AC module 22 in response to outputting a raw character string. The auto-complete word suggestions may include an associated ranking that indicates which auto-complete word suggestion is more likely to be a correct word suggestion than the other auto-complete word suggestions.

In this example, the auto-complete word suggestion sleek is ranked higher by AC module 22 than the other auto-complete word suggestion sleepy and as a result, UI module 20 caused UID 12 to present edit region 16B including first auto-completed word suggestion 8A (e.g., sleek). In response to the determination made by UI module 20 (based on the second indication of the at least one user input) that first auto-completed word suggestion 8A is incorrect, UI module 20 may replace edit region 16B of user interface 14 with edit region 16C which includes second auto-completed word suggestion 8B (e.g., sleepy, the second highest ranked auto-complete word suggestion from AC module 22). UI module 20 may cause UID 12 to update the presentation of user interface 14 by outputting user interface 14 with edit region 16C for display at the presence-sensitive screen.

In some examples, first auto-complete word suggestions 8A and 8B are outputted for display directly within edit regions 16B and 16C respectively. Neither edit regions 16B or 16C are word suggestion bar regions (e.g., a graphical representation of selectable auto-complete word suggestions). For instance, rather than output first and second auto-completed word suggestions 8A and 8B within a word suggestion bar region, first and second auto-completed word suggestions 8A and 8B are outputted for display to directly replaces raw character string 4 and first auto-completed word suggestion 8A respectively.

Figure 2:
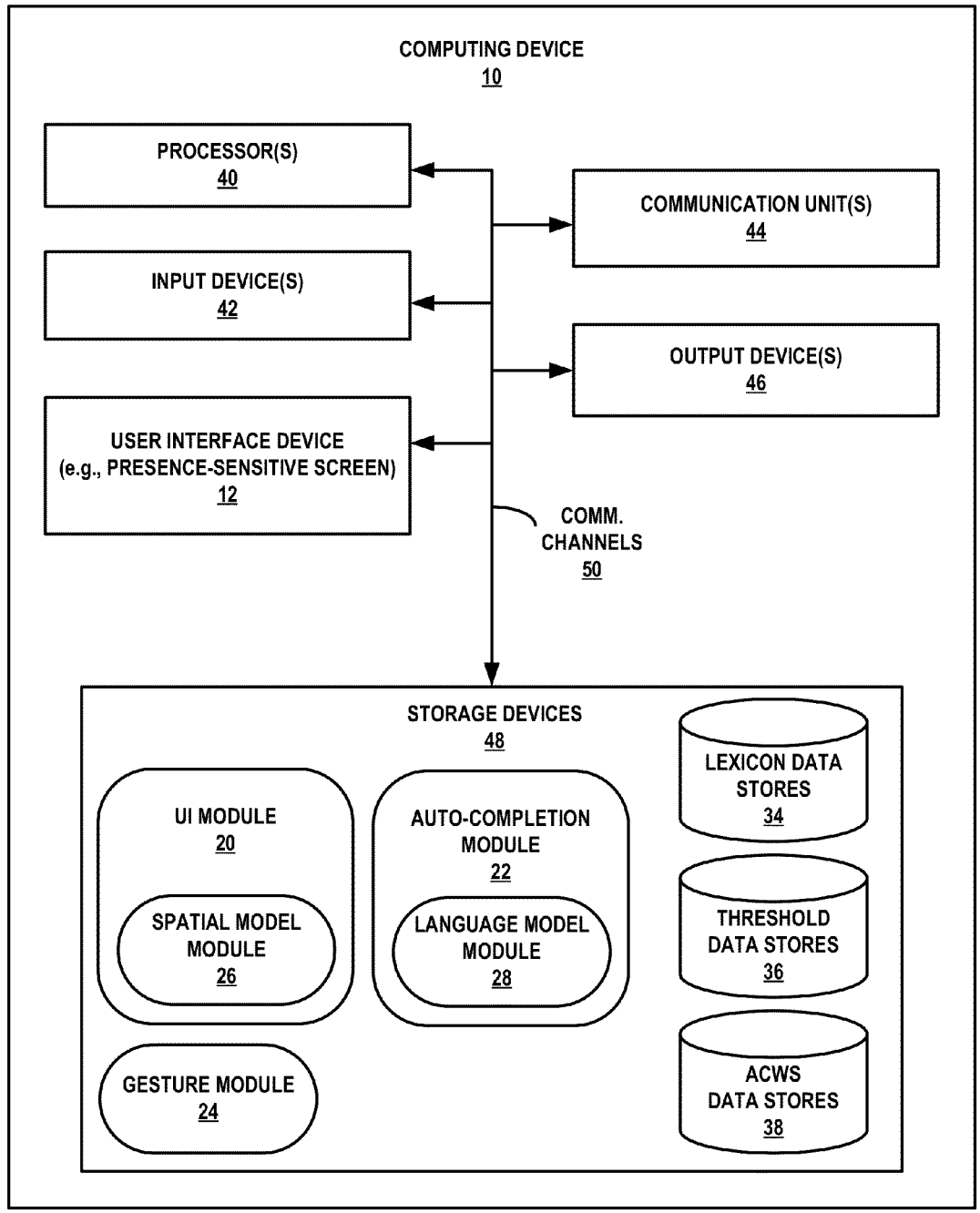
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, auto-completion module 22 ("AC module 22"), gesture module 24, lexicon data stores 34, threshold data stores 36, and auto-complete word suggestion data stores 38 ("ACWS data stores 38"). UI module 20 includes spatial model module 26 ("SM module 26"). AC module 22 includes language model module 28 ("LM module 28"). Communication channels 50 may interconnect each of the components 12, 13, 20, 22, 24, 26, 28, 34, 36, 38, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive screen (e.g., display). In some examples, a presence sensitive screen may detect an object at and/or near the presence-sensitive screen. As one example range, a presence-sensitive screen may detect an object, such as a finger or stylus that is within 2 inches or less of the presence-sensitive screen. The presence-sensitive screen may determine a location (e.g., an (x,y) coordinate) of the presence-sensitive screen at which the object was detected. The presence-sensitive screen may determine the location of the screen selected by a user's finger using capacitive, inductive, and/or optical recognition techniques. In some examples, presence sensitive screen provides output to a user using tactile, audio, or video stimuli as described with respect to output device 46. In the example of FIG. 2, UID 12 presents a user interface (such as user interface 14 of FIG. 1), and other various functions and applications executing at computing device 10 at UID 12.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., lexicon data stores 34 of computing device 10 may store data related to one or more written languages, such as words and common pairings of words, accessed by AC module 22 and/or LM module 28 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, AC module 22, gesture module 24, SM module 26, LM module 28, lexicon data stores 34, threshold data stores 36, and ACWS data stores 38.

One or more processors 40 may implement functionality and/or execute instructions within computing device 10. For example, processors 40 of computing device 10 may receive and execute instructions stored by storage devices 48 that execute the functionality of UI module 20, AC module 22, gesture module 24, SM module 26, and LM module 28. These instructions executed by processors 40 may cause computing device 10 to store information, within storage devices 48 during program execution. Processors 40 may execute instructions of modules 20-28 to cause UID 12 to output for display user interface 8 with edit region 16A and graphical keyboard 18 at UID 12. That is, modules 20-28 may be operable by processors 40 to perform various actions, including receiving user input detected at locations of UID 12 and causing UID 12 to present user interface 14 at UID 12.

The techniques are now further described in detail with reference to FIG. 2. In the example of FIG. 2, computing device 10 may output for display at UID 12, user interface 14 including edit region 16A and graphical keyboard 18 which includes a plurality of keys. For example during operational use of computing device 10, UI module 20 of computing device 10 may generate user interface 14 including edit region 16A and the plurality of keys of graphical keyboard 18. UI module 20 may transmit a display command and data over communication channels 50 to cause UID 12 to present user interface 14 at UID 12. UI module 20 may send information to UID 12 that includes instructions for displaying user interface 14 at UID 12. UID 12 may receive the display command and data from UI module 20 and cause UID 12 to present user interface 14.

Computing device 10 may receive, at an input device, a first indication of at least one user input to select one or more textual characters. For example, a user of computing device 10 may provide input at UID 12 by tapping and/or swiping at locations of UID 12 wherein UID 12 presents the keys of graphical keyboard 18. As previously described, tap locations 2 of FIG. 2 represent locations of UID 12 where the first indication of the at least one user input is detected. UID 12 may receive the user input detected at UID 12 and send information corresponding to the user input over communication channels 50 to gesture module 24. UID 12 may virtually overlay a grid of coordinates onto UID 12. The grid may not be visibly displayed by UID 12. The grid may assign a coordinate that includes a horizontal component (X) and a vertical component (Y) to each location. Each time UID 12 detects user input at UID 12, gesture module 24 may receive information from UID 12. The information may include one or more coordinate locations and associated times indicating to gesture module 24 both, where UID 12 detects user input at UID 12, and when UID 12 detects user input.

Gesture module 24 may order the information received from UID 12 into a time-ordered sequence of touch events. The sequence of touch events may represent a sequence of one or more taps and/or gestures performed by a user at UID 12. Each touch event in the sequence may include a location component as the coordinate location of the user input, a time component as the time associated with the user input, and an action component. The action component may indicate whether the touch event corresponds to a push down at UID 12 or a lift up at UID 12.

Gesture module 24 may transmit the sequence of touch events over communication channels 50 to UI module 20. UI module 20 may receive the sequence of touch events from gesture module 24 and determine UID 12 received an indication of a selection of one or more of the plurality of keys of graphical keyboard 18. In other words, UI module 20 may compare the location components of each gesture in the sequence to an area of UID 12 that presents graphical keyboard 18. Based on the comparison, UI module 20 may determine the location components of each gesture correspond to a location within graphical keyboard 18 and may determine each of the gestures approximates a selection of one or more keys of graphical keyboard 18.

To decipher the selection of one or more keys, UI module 20 may utilize SM module 26 to determine the selection of one or more keys from the sequence of touch events. For example, UI module 20 may share the sequence of touch events received from gesture module 24 and each key location (e.g., relative to where UID 12 presents each key at the presence-sensitive screen) of the plurality of keys of graphical keyboard 18 with SM module 26. SM module 26 may determine, based on the location and time components of each of the touch events, whether the gesture represents one or more key selections. For instance, SM module 26 may compare the location components of one or more touch events in the sequence of touch events to each key location, and for each key, generate a SMP that a selection of the key occurred. The location components of each touch event in the sequence may include one or more locations of UID 12. A key location (e.g., a centroid of a key) may include a different location of UID 12.

SM module 26 may determine a probability that the user input corresponds to a selection of a key based on a Euclidian distance between the key location and one or more of the touch event locations. SM module 26 may correlate a higher probability to a key that shares a smaller Euclidian distance with a location component of a touch event than a key that shares a greater Euclidian distance with a location component of a touch event (e.g., the probability of a key selection may exceed ninety nine percent when a key shares a near zero Euclidian distance to a location component of a touch event and the probability of the key selection may decrease proportionately with an increase in the Euclidian distance). Based on the probability associated with each key, UI module 20 may assemble the individual key selections with the highest spatial model probabilities into a time-ordered sequence of keys. Per the example illustrated in FIG. 1, the key sequence may include the <S-key>, <L-key>, <E-key>, again the <E-key>, and spacebar key 30.

UI module 20 may identify one or more keys in the sequence of keys that represent an end of character string identifier. For instance, UI module 20 may determine that when a selection of spacebar key 30 or a key corresponding to a punctuation mark appears in a sequence of keys that this spacebar or punctuation key selection corresponds to an end of a word (e.g., an end of character string) identifier. UI module 20 may determine the keys that appear prior to an end of character string identifier in the sequence of keys correspond to a character string.

UI module 20 may generate a raw character string (e.g., one or more textual characters) based on the selection of keys that appear prior to the selection of spacebar key 30 in the sequence of keys. For example, the selection of spacebar key 30 may indicate an end of character string. UI module 20 may associate each key in the sequence of keys that appear prior to the selection of spacebar key 30 (e.g., <S-key>, <L-key>, <E-key>, and again the <E-key>) correspond to the one or more textual characters s-l-e-e and generate raw character string 4. UI module 20 may output raw character string 4 over communication channels 50, along with a command to update the presentation of user interface 14, to UID 12. UI 12 may receive the character string output and command from UI module 20 and present character string 4 within edit region 16A of user interface 14.

Computing device 10 may determine a plurality of auto-complete word suggestions based at least in part on the one or more textual characters. For example, in conjunction with and/or prior to UI module 20 outputting raw character string 4 to UID 12, UI module 20 may output raw character string 4 over communication channels 50 to AC module 22 to determine a plurality of auto-complete word suggestions based at least in part on the one or more textual characters that make up raw character string 4. AC module 22 may receive raw character string 4 over communication channels 50 from UI module 20 and determine one or more auto-complete word suggestions based on raw character string 4. For example, AC module 22 may utilize lexicon data stores 34, Jaccard similarity coefficient techniques, and/or LM module 28 to determine the plurality of auto-complete word suggestions based at least in part on the one or more textual characters that make up raw character string 4.

Lexicon data stores 34 may include one or more sorted databases (e.g., hash tables, linked lists, sorted arrays, graphs, etc.) that represent dictionaries for one or more written languages. Each dictionary may include a list of words and word combinations within a written language vocabulary. AC module 22 may perform a lookup in lexicon data stores 34 for raw character string 4 by comparing character string 4 to each of the words in lexicon data stores 34. AC module 22 may assign a Jaccard similarity coefficient to each word in the lexicon based on the comparison and determine one or more initial, auto-complete word suggestions with a greatest Jaccard similarity coefficient. In other words, initially, the one or more auto-complete word suggestions with the greatest Jaccard similarity coefficient may represent the words in lexicon data stores 34 with spellings that most closely correlate to the spelling of character string 4.

AC module 22 may determine one or more words in lexicon data stores 34 that include parts or all of the characters of character string 4 and determine the one or more words with the highest Jaccard similarity coefficient represent the one or more, initial, auto-complete word suggestions. In some examples, the auto-complete word suggestion with the highest Jaccard similarity coefficient matches character string 4 (e.g., the character string generated from the key sequence). The initial auto-complete word suggestions with the highest Jaccard similarity coefficient for character string 4 (e.g., slee) may include sleek, sleepy, sleep, and the like.

AC module 22 may utilize LM module 28 to determine a plurality of auto-complete word suggestions based on character string 4. LM module 28 may determine a probability (e.g., a language model probability or simply "LMP") that an initial, auto-complete word suggestion identified using Jaccard similarity coefficient techniques, is positioned in a sequence of words subsequent to one or more words received prior to character string 4. In other words, a sequence of words may include one or more words received prior to the at least one user input corresponding to character string 4. The LMP of an initial, auto-complete word suggestion may indicate a likelihood that the initial, auto-complete word suggestion completes the sequence. In some examples, the LMP of an initial, auto-complete word suggestion may indicate a probability that the initial, auto-complete word suggestion is grammatically positioned subsequent to the sequence of words (e.g., a sentence). In some examples, LM module 28 may use rules not based on grammar (e.g., patterns of slang or colloquial word use) to determine a LMP that an initial, auto-complete word suggestion is positioned subsequent to the sequence of words.

LM module 28 may use one or more n-gram language models to determine a LMP associated with an auto-complete word suggestion. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the word "sleek" follows the word "a" in a sequence (i.e., a sentence). A quad-gram language model (an n-gram model where n=4) may provide a probability that the word "sleepy" follows the three words a time a in a sequence.

LM module 28 may use n-gram language models in combination with the data within lexicon data stores 34 to determine a plurality of auto-complete word suggestions. In other words, LM module 28 may determine a LMP for two or more words in lexicon data store 34 and determine the two or more words with a greatest LMP represent the plurality of auto-complete word suggestions. For example, computing device 10 may determine one or more prior words received at a time prior to receiving the at least one user input (e.g., a user may provide user input at graphical keyboard 18 presented at UID 12 and computing device 10 may determine the user input corresponds to the prior words Once upon a time, a).

AC module 22 may determine, based on the one or more prior words, the LMP of the one or more initial, auto-complete word suggestions, identified by AC module 22 from lexicon data store 34, that indicates a likelihood that each of the one or more initial, auto-complete word suggestions is positioned subsequent to the one or more words received prior to the at least one user input. In other words, AC module 22 may cause LM module 28 to determine a LMP associated with the words sleek, sleepy, sleep, etc., appearing subsequent to the words "a time a" in a sequence (e.g., sentence).

AC module 22 may rank the one or more initial, auto-complete word suggestions in order based on the respective LMP of each initial, auto-complete word suggestion. AC module 22 may determine the initial, auto-complete word suggestions 8A and 8B (e.g., sleek and sleepy) represent a highest and a next highest ranked auto-complete word suggestion for character string 4. AC module 22 may output the plurality of auto-complete word suggestions 8 (e.g., sleek and sleepy) and the respective ranking of these auto-complete word suggestions 8, to UI module 20.

Computing device 10 may output for display, and based at least in part on the one or more textual characters, first auto-complete word suggestion 8A of the plurality of auto-complete word suggestions 8. In other words, UI module 20 may cause UID 12 to output for display, the highest ranked auto-complete word suggestion 8A (e.g., sleek) within user interface 14. In some examples, UI module 20 may cause UID 12 to output auto-complete word suggestion 8A within user interface 14 in place of character string 4. UI module 20 may transmit the auto-complete word suggestion sleek to UID 12 with instructions for updating the presentation of user interface 14 over communication channels 50 to UID 12. In response to the output received from UI module 20, UID 12 may update the presentation of user interface 14 to include auto-complete word suggestion 8A (as illustrated in FIG. 1 as edit region 16B in place of edit region 16A).

Computing device 10 may receive, at the input device, a second indication of the at least one user input that indicates first auto-complete word suggestion 8A is incorrect. In other words, UID 12 may detect a second indication of the at least one user input at UID 12. The second indication may comprise a representation of a non-tap gesture detected at a location of UID 12. Gesture module 24 may receive information about the second indication of the at least one user input from UID 12 and determine a second sequence of touch events associated with the at least one user input. The second sequence of touch events may include one or more touch events associated with location 6 of UID 12 where UID 12 presents backspace key 32 of graphical keyboard 18. Gesture module 24 may transmit the second sequence of touch events to UID module 20. Based on the location components of the second sequence of touch events received from gesture module 24, UI module 20 may determine the second indication of the at least one user input represents a selection of backspace key 32.

UI module 20 may determine that a selection of backspace key 32 that follows an output of first auto-completed word suggestion 8A represents an indication from the user that first auto-complete word suggestion 8A is incorrect. In other words, UI module 20 may associated the use of backspace key 32 at a time subsequent to when UI module 20 causes UID 12 to present first auto-complete word suggestion 8A as being an indication from the user that first auto-complete word suggestion 8A does not represent the intended textual character input.

Responsive to receiving the second indication, computing device 10 may output, for display at UID 12, second auto-complete word suggestion 8B of the plurality of auto-complete word suggestions 8 to replace first auto-complete word suggestion 8A. First auto-complete word suggestion 8A may be more probable than second-autocomplete word suggestion 8B. In other words, as described above, UI module 20 may receive two or more auto-complete word suggestions 8 from AC module 22 in response to determining raw character string 4. Each auto-complete word suggestions 8 may include an associated ranking (e.g., based on a LMP from LM module 28, etc.) that indicates which auto-complete word suggestion 8 is more likely to be a correct word suggestion than the other auto-complete word suggestions 8.

In this example, auto-complete word suggestion 8A (e.g., sleek) was ranked higher by AC module 22 than other auto-complete word suggestions (e.g., sleepy, sleep, etc.) and as a result, UI module 20 caused UID 12 to present edit region 16B including first auto-completed word suggestion 8A. In response to the determination made by UI module 20 (based on the second indication of the at least one user input) that first auto-completed word suggestion 8A is incorrect, UI module 20 may replace edit region 16B of user interface 14 with edit region 16C which includes second auto-completed word suggestion 8B (e.g., sleepy, the second highest ranked auto-complete word suggestion from AC module 22). UI module 20 may command UID 12 to update the presentation of user interface 14 by outputting user interface 14 with edit region 16C for display at the presence-sensitive screen.

In some examples, computing device 10 may determine a probability that the one or more textual characters represent an incorrect arrangement of characters of the second auto-complete word suggestion, and in response to determining the probability satisfies or exceeds a threshold, computing device 10 may output the second auto-complete word suggestion for display at the output device. For example, UI module 20 may receive auto-complete word suggestions 8A, 8B from AC module 22 and for each auto-complete word suggestion, also receive a corresponding probability (e.g., a LMP, etc.) that indicates a likelihood that the at least one user input corresponds to the auto-complete word suggestion 8A, 8B. UI module 20 may determine that the second indication (e.g., a selection of backspace key 32), which follows the output of first auto-completed word suggestion 8A represents an indication from the user that first auto-complete word suggestion 8A is incorrect.

Rather than automatically cause UID 12 to output second auto-complete word suggestion 8B for display at UID 12 to replace first auto-complete word suggestion 8A, UI module 20 may utilize one or more thresholds stored at threshold data stores 36 to determine whether the likelihood that second auto-complete word suggestion 8B is sufficient to warrant its output. In other words, if UI module 20 determines the probability of second auto-complete word suggestion 8B satisfies or exceeds one or more thresholds stored at data stores 36 (e.g., if the probability is greater than the value of a threshold, less than the value of a threshold, etc.) UI module 20 may cause UID 12 to output second auto-complete word suggestion 8B to replace first auto-complete word suggestion 8A.

In some examples, in response to determining the probability does not satisfy the threshold, computing device 10 may refrain from outputting for display second auto-complete word suggestion 8B, and computing device 10 may output for display at the output device (e.g., UID 12), the one or more textual characters (e.g., character string 4) in place of first auto-complete word suggestion 8A. In other words, if UI module 20 determines the probability of second auto-complete word suggestion 8B does not satisfy one or more thresholds stored at data stores 36 (e.g., if the probability is less than the value of a threshold, greater than the value of a threshold, etc.) UI module 20 may refrain from causing UID 12 to output second auto-complete word suggestion 8B to replace first auto-complete word suggestion 8A and instead cause UID 12 to output character string 4 to replace first auto-complete word suggestion 8A. In this way, the second indication (e.g., the selection of backspace key 32) may provide a way for a user to reject the use of auto-completion techniques and instead cause computing device 10 to output for display the one or more textual characters that the user entered.

In some examples, computing device 10 may store at least some state information to identify the plurality of auto-complete word suggestions 8 and responsive to receiving the second indication, computing device 10 may retrieve second auto-complete word suggestion 8B from the stored at least some state information to replace first auto-complete word suggestion 8A. In other words, computing device 10 may "remember" auto-complete word suggestions by storing the auto-complete word suggestions, a memory pointer to some of the auto-complete word suggestions, or other state information to identify the auto-complete word suggestions, for some or all previous words in the text entry (e.g., textual characters determined from user input). For instance, UI module 20 may receive the plurality of auto-complete word suggestions from AC module 22 and upon receipt, store the plurality of auto-complete word suggestions or a memory pointer to locations in lexicon data stores 34 where the plurality of auto-complete word suggestions are stored, within ACWS data stores 38 along with an identifier that indicates which word in the current text entry that the plurality of auto-complete word suggestions corresponds to. Likewise, based on input received prior to the first indication, computing device 10 may determine the words Once, upon, a, time, and a. UI module 20 may cause AC module 22 to generate, and UI module 20 may store, a pointer to and/or the plurality of auto-complete word suggestions for each of the words Once, upon, a, time, and a, and store each plurality of auto-complete word suggestions and the corresponding word as a data entry within ACWS data stores 38. Computing device 10 may retain one or more auto-complete word suggestions to replace, at various times (e.g., before or after receiving additional input) any auto-complete word suggestion outputted for display in place of a word determined from detected user input.

In some examples, in response to determining the first auto-complete word suggestion is more likely to be a correct word suggestion than the second-autocomplete word suggestion, computing device 10 may replace, the one or more textual characters with the first auto-complete word suggestion. For example, UI module 20 may receive the plurality of auto-complete word suggestions from AC module 22 along with an associated ranking that indicates which auto-complete word suggestions are more likely intended word replacements for character string 4, than the other auto-complete word suggestions. UI module 20 may determine first auto-complete word suggestion 8A is more likely to be a correct word suggestion based on the associated ranking from AC module 22. In response, UI module 20 may cause UID 12 to output for display first auto-complete word suggestion 8A, and not second auto-complete word suggestion 8B or any other auto-complete word suggestion, to replace character string 4.

In some examples, computing device 10 may determine, for each auto-complete word suggestion of the plurality of auto-complete word suggestions, a probability that the one or more textual characters represent an incorrect arrangement of characters of one or more of the plurality of auto-complete word suggestions. The probability of the first auto-complete word suggestion may exceed the probability of the second auto-complete word suggestion.

In other words, AC module 22 may determine a probability that one or more words in lexicon data stores 34 represent an incorrect spelling of character string 4. In some examples, AC module 22 of computing device 10 may determine, using an n-gram language model, the probability of at least one auto-complete word suggestion of the plurality of auto-complete word suggestions. In some examples, AC module 22 of computing device 10 may determine the probability of at least one auto-complete word suggestion of the plurality of auto-complete word suggestions based at least in part on a similarity coefficient between the at least one auto-complete word suggestion and one or more words in lexicon data stores 34. In any event, whether using a language model, a similarity coefficient, or other techniques to determine whether the one or more characters represent an incorrect spelling of a word in lexicon data stores 34, AC module 22 of computing device 10 may determine the probability that one or more auto-complete word suggestions represent an incorrect spelling of character string 4 and output the probability for the one or more of the plurality of auto-complete word suggestions to UI module 20 for use in determining which auto-complete word suggestion to replace character string 4.

In some examples, computing device 10 may determine the plurality of auto-complete word suggestions in response to identifying, by computing device 10, an end of word identifier from the one or more textual characters. The end of word identifier may comprise a representation of a whitespace character, a punctuation character, or a null value character. In other words, UI module 20 may determine a sequence of keys selected based on the first indication of the at least one user input. UI module 20 may identify one or more keys in the sequence of keys that represent an end of character string identifier (e.g., spacebar key 30, a key corresponding to a punctuation mark, etc.). UI module 20 may determine that the keys that represent textual characters and appear prior to an end of character string identifier in the sequence of keys correspond to a character string. UI module 20 may determine the character string from the sequence of keys and in response to the end of character string identifier, utilize AC module 22 to determine a plurality of auto-complete word suggestions.

In some examples, computing device 10 may determine, based on the second indication, a deletion of an end of word identifier from the one or more textual characters. Computing device 10 may determine, based on the deletion, the first auto-complete word suggestion is incorrect. For example, UI module 20 may receive from gesture module 24 a second sequence of touch events corresponding to a second indication of the at least one user input. UI module 20 may determine the second sequence of touch events represents a selection of backspace key 32. UI module 20 may determine that when the selection of backspace key 32 follows a selection of a key corresponding to an end of character string identifier (e.g., space key 30 as the last key in the first sequence of touch events based on the first indication of the at least one user input) that the backspace key selection (e.g., a deletion) indicates that the first auto-complete word suggestion is incorrect. In response to determining the indication that the first autocomplete word suggestion is incorrect, UI module 20 may cause UID 12 to output the second auto-complete word suggestion for display at UID 12.

In other words, computing device 10 may determine that a selection of one or more keys that represents textual characters, followed by a selection of a space key 30 (or any other key that represents an end of word identifier, for instance a representation of a whitespace character, a punctuation character, a null value character, etc.) and a selection of backspace key 32, indicates that an auto-complete word suggestion is incorrect. In response to an indication that an auto-complete word suggestion is incorrect, computing device 10 may output for display a next highest ranking auto-complete word suggestion.

In some examples, a deletion of an end of word identifier may be determined by computing device 10 upon receipt of an indication of a control character indicating a backspace. For example, a control character or non-printing character may contain a code point (e.g., a number) in a character set that does not in represent a written symbol. Non-control characters of a character set may represent printable and/or graphic characters that do represent a written symbol. Examples of character sets that use control characters may include the American Standard Code for Information Interchange (ASCII) character set, the Extended Binary Coded Decimal Interchange Code (EBCDIC) character set, and the Unicode character set. Computing device 10 may determine a deletion of an end of word identifier in response to an indication of a selection of ASCII control character eight (e.g., backspace) determined by UI module 20.

Figure 3:
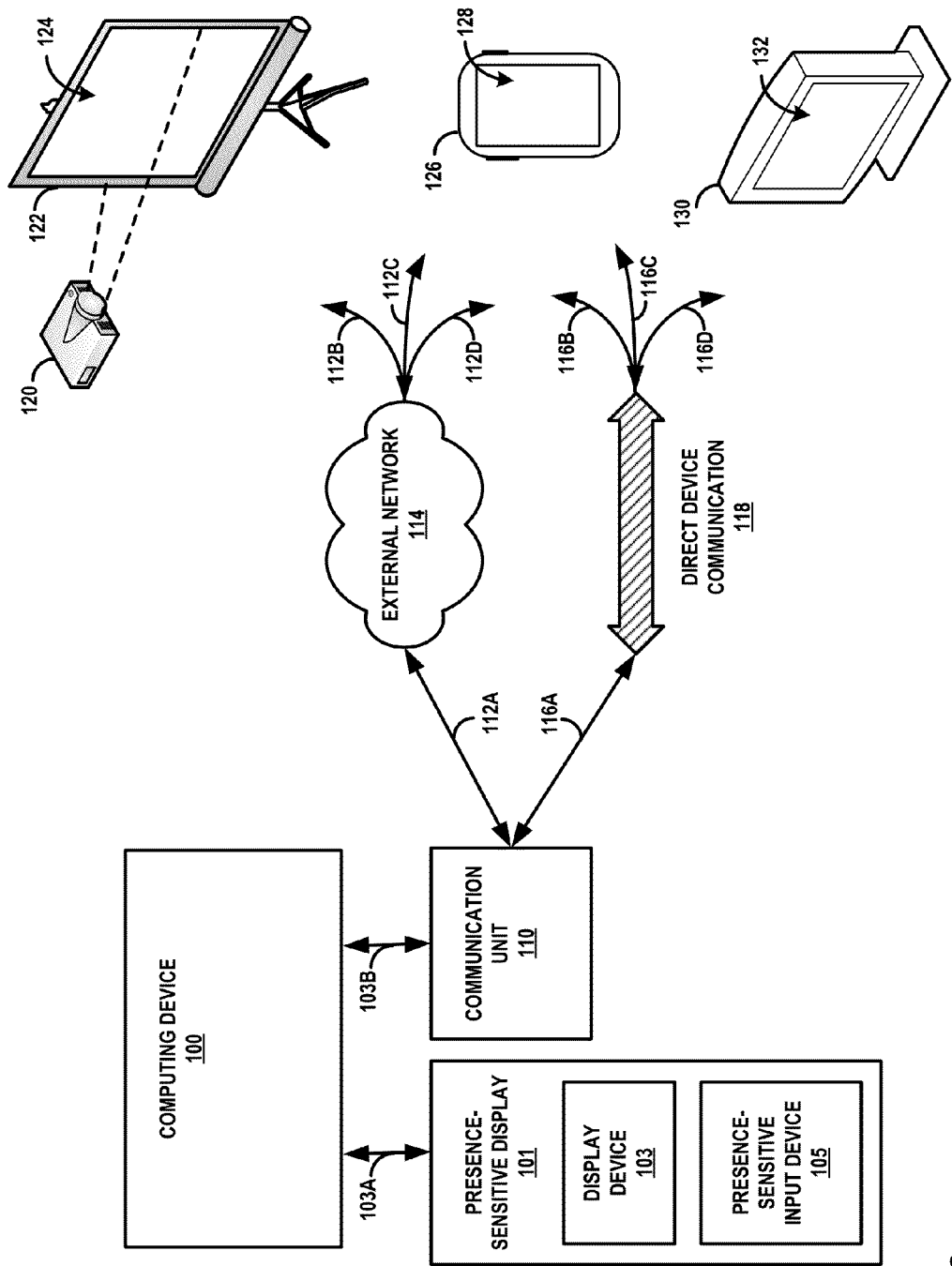
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, tablet device 126, and visual display device 130. Although shown for purposes of example in FIGS. 1 and 2 as a stand-alone computing device 10, a computing device such as computing device 100 and/or computing device 10 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 103A, which may be a system bus or other suitable connection. Computing device 100 may also be operatively coupled to communication unit 110, further described below, by a communication channel 103B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing devices 10 in FIGS. 1-2, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, like user interface device 12 as shown in FIG. 1, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 103A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates tablet device 126 and visual display device 130. Tablet device 126 and visual display device 130 may each include computing and connectivity capabilities.

Examples of tablet device 126 may include e-reader devices, convertible notebook devices, hybrid slate devices, etc. Examples of visual display device 130 may include televisions, computer monitors, etc. As shown in FIG. 3, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 103A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi_33, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical keyboard for display at presence-sensitive display 132. For instance, computing device 100 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing at least one user input at presence-sensitive display 132 to select a group of keys of the keyboard, visual display device 130 may send a first indication of the at least one user input to computing device 100 using external network 114. Communication unit 110 of may receive the indication of the at least one user input, and send the indication to computing device 100.

Computing device 100 may determine a selection of one or more textual characters, based on the indication of the at least one user input. For example, in some instances, computing device 100 determines a sequence of touch events from the first indication and determines a sequence of one or more keys corresponding to the at least one user input. From the sequence of keys, computing device 100 determines one or more textual characters (e.g., a character string). In some examples, computing device 100 may send data that includes a representation of the one or more textual characters to communication unit 110. Communication unit 110 computing device 100 may send the data representation to visual display device 130 using external network 114. Visual display device 130, in response to receiving the one or more textual characters using external network 114, may cause presence-sensitive display 132 to output the one or more textual characters.

Computing device 100 may determine a plurality of auto-complete word suggestions based at least in part on the one or more textual characters. For instance, computing device 100 may utilize a language model to determine two or more auto-complete word suggestions (and an associated ranking) from a lexicon. The two or more auto-complete word suggestions may represent intended words being entered based on the at least one user input. Computing device 100 may output for display, based at least in part on the one or more textual characters, a first auto-complete word suggestion of the plurality of auto-complete word suggestions. The highest ranked auto-complete word suggestion from the lexicon and language model may be the first auto-complete word suggestion. Computing device 100 may send data that includes a representation of the first auto-complete word suggestion to communication unit 110. Communication unit 110 may send the data that includes the representation of the first auto-complete word suggestion to visual display device 130 using external network 114. Visual display device 130, in response to receiving the data using external network 114, may cause presence-sensitive display 132 to output the first auto-complete word suggestion for display.

Having caused presence-sensitive display 132 to output the first auto-complete word suggestion, visual display device 130 may receive a second indication of the at least one user input at presence-sensitive display 132 that indicates the first auto-complete word suggestion is incorrect. Visual display device 130 may send the second indication of the at least one user input to computing device 100 using external network 114. Communication unit 110 of may receive the second indication of the at least one user input, and send the second indication to computing device 100. Computing device 100 may determine a second sequence of touch events from the second indication and determine that the second sequence represents an indication that the first auto-complete word suggestion is incorrect. In response, computing device 100 may send data that includes a representation of the next highest ranked auto-complete word suggestion (e.g., a second auto-complete word suggestion) to communication unit 110. Communication unit 110 computing device 100 may send the data representation to visual display device 130 using external network 114. Visual display device 130, in response to receiving the next highest ranked auto-complete word suggestion using external network 114, may cause presence-sensitive display 132 to output the next highest ranked auto-complete word suggestion that replaces the first auto-complete word suggestion.

Figure 4:
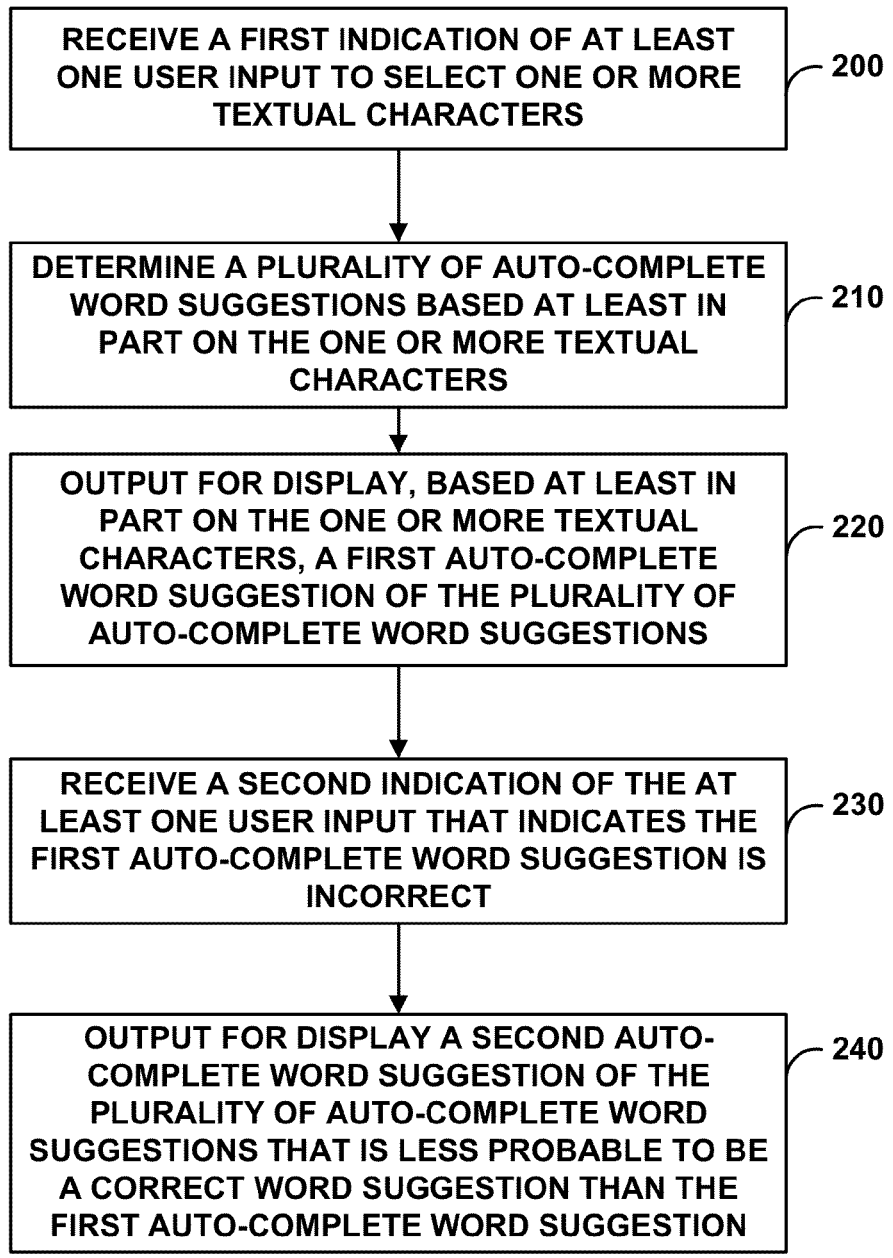
FIG. 4 is a flowchart illustrating an example operation of the computing device, in accordance with one or more aspects of the present disclosure.

FIG. 4 is a flowchart illustrating an example operation of the computing device, in accordance with one or more aspects of the present disclosure. The process of FIG. 4 may be performed by one or more processors of a computing device, such as computing device 10 illustrated in FIG. 1 and FIG. 2. For purposes of illustration only, FIG. 4 is described below within the context of computing devices 10 of FIG. 1 and FIG. 2.

In the example of FIG. 4, a computing device may receive a first indication of at least one user input to select one or more textual characters (200). For example, computing device 10 may output user interface 14 including graphical keyboard 18 for display at UID 12. A user that interacts with user interface 14 may tap at locations 2 of UID 12 where UID 12 presents individual keys of graphical keyboard 18. UID 12 may detect and register the taps at locations 2 as an indication of at least one user input. UI module 20 may receive information from UID 12 about the at least one user input detected at tap locations 2 of UID 12.

UI module 20 may determine a sequence of touch events based on the information from UID 12 and determine one or more keys of graphical keyboard 18 that may have been selected from the at least one user input. From the one or more keys, UI module 20 may determine one or more textual characters (e.g., character string 4) corresponding to the indication of the at least one user input.

In the example of FIG. 4, the computing device may determine a plurality of auto-complete word suggestions based at least in part on the one or more textual characters (210). For example, UI module 20 may, rather than, or in addition to, outputting character string 4 for display at UID 12, output the one or more textual characters to AC module 22 for determining a plurality of auto-complete word suggestions. AC module 22 may utilize a word-level n-gram language model and/or techniques that utilize a Jaccard similarity coefficient, to determine the one or more auto-complete word suggestions that may represent character input that the user may have intended to enter with the at least one user input detected at UID 12. AC module 22 may output the one or more auto-complete word suggestions to UI module 20.

In the example of FIG. 4, the computing device may output for display, based at least in part on the one or more textual characters, a first auto-complete word suggestion of the plurality of auto-complete word suggestions (220). For example, UI module 20 may receive the one or more auto-complete word suggestions along with an associated ranking of the auto-complete word suggestions from AC module 22. UI module 20 may output for display the highest ranking auto-complete word suggestion. In other words, UI module 20 may cause UID 12 to update the presentation of user interface 14 with edit region 16B which includes first auto-complete word suggestion 8A.

In the example of FIG. 4, the computing device may receive, at the input device, a second indication of the at least one user input that indicates the first auto-complete word suggestion is incorrect (230). For instance, in some examples, the highest ranking auto-complete word suggestion determined by AC module 22 may not actually represent the word the user intended to enter with the at least one user input. To correct the incorrect determination made by AC module 22 of computing device 10, the user may provide an additional input. UID 12 may detect a second indication of the at least one user input at UID 12. UI module 20 may receive information about the second indication of the at least one user input and determine a second sequence of touch events associated with the at least one user input. The second sequence of touch events may include one or more touch events associated with a location of UID 12 where UID 12 presents one or more keys (e.g., backspace key 32) of graphical keyboard 18. UI module 20 may determine that a second indication of the at least one user input, which follows the output of first auto-completed word suggestion 8A, represents an indication from the user that the first auto-complete word suggestion is incorrect.

In the example of FIG. 4, responsive to receiving the second indication, the computing device may output, for display, a second auto-complete word suggestion of the plurality of auto-complete word suggestions that is less probable to be a correct word suggestion than the first auto-complete word suggestion (240). In other words, UI module 20 may have received two or more auto-complete word suggestions from AC module 22 and an associated ranking that indicates which auto-complete word suggestions are more probable than the other auto-complete word suggestions. In response to the determination made by UI module 20 that first auto-completed word suggestion 8A is incorrect, UI module 20 may cause UID 12 to replace edit region 16B of user interface 14 by outputting for display edit region 16C, including second auto-complete word suggestion 8B (e.g., a next highest ranked auto-complete word suggestion) in place of the first auto-complete word suggestion 8A.

Figure 5:
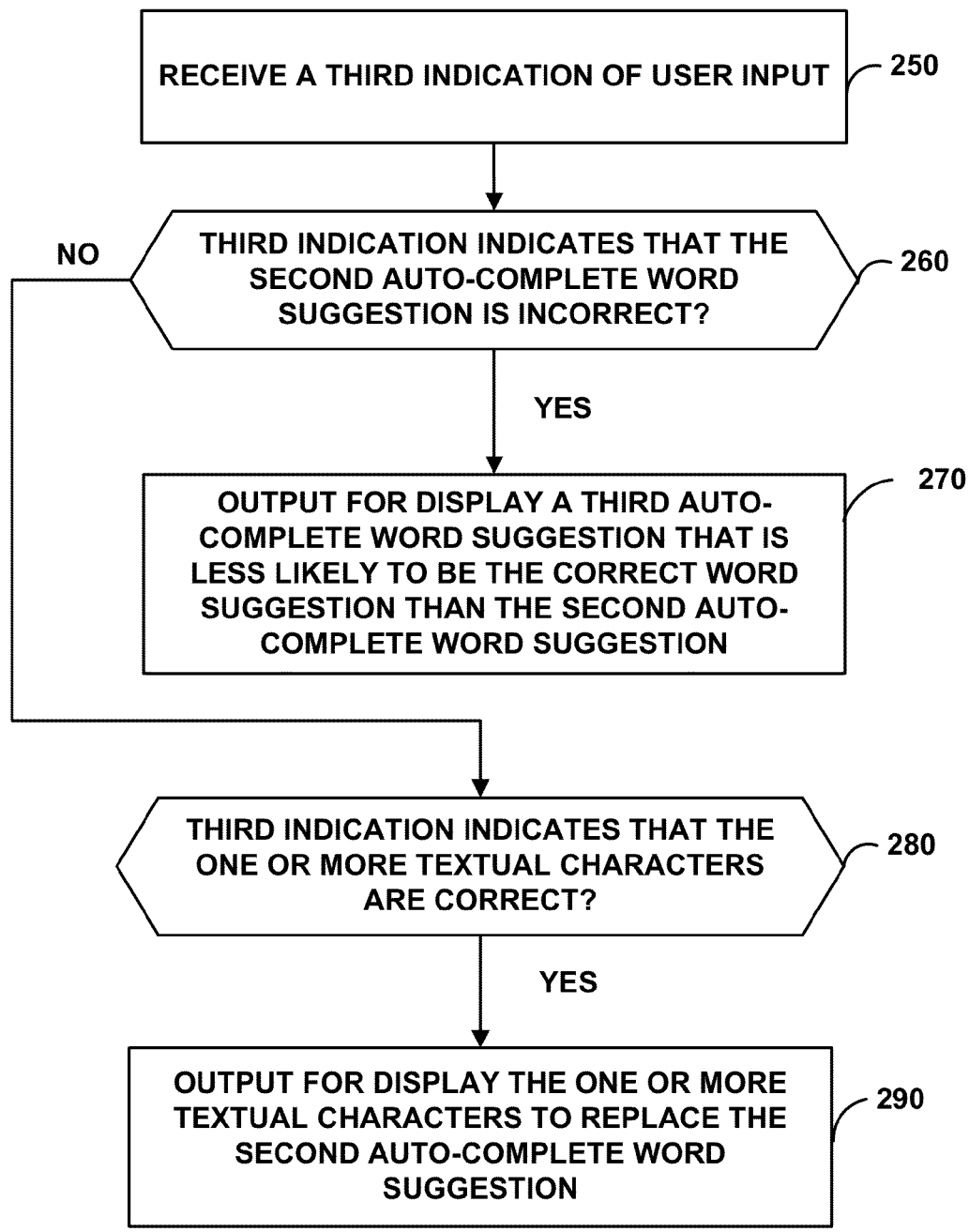
FIG. 5 is a flowchart illustrating an alternative example operation of the computing device, in accordance with one or more aspects of the present disclosure.

FIG. 5 is a flowchart illustrating an alternative example operation of the computing device, in accordance with one or more aspects of the present disclosure. The process of FIG. 5 may be performed by one or more processors of a computing device, such as computing device 10 illustrated in FIG. 1 and FIG. 2. For purposes of illustration only, FIG. 5 is described below within the context of computing devices 10 of FIG. 4 and assumes that operations 200-240 of FIG. 4 have been performed by computing device 10.

In the example of FIG. 5, computing device 10 may receive a third indication of user input (250). For example, subsequent to outputting second auto-complete word suggestion 8B to replace first auto-complete word suggestion 8A, UID 12 may detect a third input (e.g., a tap or non-tap gesture) at a location of the presence-sensitive screen.

Computing device 10 may determine whether the third indication of user input indicates that second auto-complete word suggestion 8B is incorrect (260). For example, UI module 20 may receive one or more touch events corresponding to the user input and determine the touch events represent a selection of backspace key 32. A selection of backspace key 32 following the output of second auto-complete word suggestion 8B may indicate to computing device 10 that second auto-complete word suggestion 8B is incorrect.

Responsive to receiving the third indication, computing device 10 may output, for display, a third auto-complete word suggestion that is less likely to be the correct word suggestion than the second auto-complete word suggestion (270). For example, UI module 20 may receive the one or more auto-complete word suggestions along with an associated ranking of the auto-complete word suggestions from AC module 22. UI module 20 may replace the next highest ranking auto-complete word suggestion (e.g., auto-complete word suggestion 8B), with a different next highest ranking auto-complete word suggestion. In other words, for example, UI module 20 may replace a second highest ranking auto-complete word suggestion with a third highest ranking auto-complete word suggestion. UI module 20 may cause UID 12 to update the presentation of user interface 14 to include the third auto-complete word suggestion in place of auto-complete word suggestion 8B.

Computing device 10 may determine whether the third indication of user input indicates that the one or more textual characters are correct (280). Or in other words, computing device 10 may determine that the third indication of user input indicates that the user does not want computing device 10 to output an auto-complete word suggestion in place of raw character string 4. For example, UI module 20 may receive one or more touch events corresponding to the user input and determine the touch events represent a selection of backspace key 32. A selection of backspace key 32 following the output of second auto-complete word suggestion 8B may indicate to computing device 10 that the one or more textual characters (e.g. character string 4) are correct.

Responsive to receiving the third indication, computing device 10 may output, for display, the one or more textual characters to replace second auto-complete word suggestion 8B (290). For example, UI module 20 replace the next highest ranking auto-complete word suggestion (e.g., auto-complete word suggestion 8B), with raw character string 4 (e.g., the one or more characters determined originally from the first indication of the at least one user input). In other words, for example, UI module 20 may replace a second highest ranking auto-complete word suggestion with the one or more textual characters in response to a third indication of user input. UI module 20 may cause UID 12 to update the presentation of user interface 14 to include the character string 4 in place of auto-complete word suggestion 8B.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. As used throughout the disclosure, the term "non-transitory" is meant to describe a storage medium that is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
after receiving, an indication of user input that selects one or more textual characters, receiving, by a computing device, an indication of user input that selects an end-of-word identifier;
determining, by the computing device, based at least in part on the one or more textual characters and in response to receiving the end-of-word identifier, a first auto-complete word suggestion from a plurality of auto-complete word suggestions, wherein the first auto-complete word suggestion is determined to be more likely to be a correct word suggestion than a second auto-complete word suggestion from the plurality of auto-complete word suggestions;

outputting, by the computing device, for display, the first auto-complete word suggestion that replaces the one or more textual characters followed by the end-of-word identifier;

receiving, by the computing device, an indication of user input that deletes the end-of-word identifier, wherein the indication of user input that deletes the end-of-word identifier comprises a combination of a selection of both a backspace key and a spacebar key; and responsive to receiving the indication of user input that deletes the end-of-word identifier, outputting, by the computing device, for display, the second auto-complete word suggestion, wherein the second auto-complete word suggestion replaces the first auto-complete word suggestion;

wherein the end-of-word identifier is a first end-of-word identifier and outputting the second auto-complete word suggestion comprises outputting, by the computing device, for display, the second auto-complete word suggestion followed by a second end-of-word identifier replacing the first auto-complete word suggestion and the first end-of-word identifier.

2. The method of claim 1, further comprising:
determining, by the computing device, a probability that the second auto-complete word suggestion represents the one or more textual characters; and
determining, by the computing device, that the probability satisfies a threshold, wherein outputting the second auto-complete word suggestion is responsive to determining that the probability satisfies the threshold.

3. The method of claim 1, further comprising:
storing, by the computing device, at least some state information to identify the plurality of auto-complete word suggestions; and
responsive to receiving the indication of user input that deletes the end-of-word identifier, retrieving, by the computing device, the second auto-complete word suggestion from the stored at least some state information to replace the first auto-complete word suggestion.

4. The method of claim 1, further comprising:
prior to outputting the first auto-complete word suggestion and the end-of-word identifier for display, outputting, by the computing device, for display, the one or more textual characters, wherein outputting the first auto-complete word suggestion of the plurality of auto-complete word suggestions comprises replacing, by the computing device, the one or more textual characters with the first auto-complete word suggestion and the end-of-word identifier.

5. The method of claim 1, further comprising:
determining, by the computing device, a respective probability that each auto-complete word suggestion of the plurality of auto-complete word suggestions represents the one or more textual characters,
wherein the respective probability of the first auto-complete word suggestion exceeds the respective probability of the second auto-complete word suggestion.

6. The method of claim 5, further comprising:
determining, by the computing device, using an n-gram language model, the respective probability of at least one auto-complete word suggestion of the plurality of auto-complete word suggestions.

7. The method of claim 5, further comprising:
determining, by the computing device, based at least in part on a similarity coefficient between the at least one auto-complete word suggestion and one or more words in a lexicon, the respective probability of at least one auto-complete word suggestion of the plurality of auto-complete word suggestions.

8. The method of claim 1, wherein the end-of-word identifier comprises a representation of a whitespace character, a punctuation character, or a null value character.

9. The method of claim 1, wherein:
the indication of user input that deletes the first end-of-word identifier is a first indication of user input to that deletes the first end-of-word identifier,
the plurality of auto-complete word suggestions comprises a third auto-complete word suggestion that is less likely to be a correct word suggestion based on the one or more textual characters than both the first auto-complete word suggestion and the second auto-complete word suggestion, and
wherein the method further comprises:
receiving, by the computing device, a second indication of user input that deletes the second end-of-word identifier; and
responsive to receiving the second indication of user input, outputting, by the computing device, for display, the third auto-complete word suggestion, wherein the third auto-complete word suggestion replaces the second auto-complete word suggestion.

10. The method of claim 1, wherein the indication of user input that selects the one or more textual characters is a first indication of user input that selects the one or more textual characters, the method further comprising:
receiving, by the computing device, a second indication of user input that selects the one or more textual characters;
determining, by the computing device, based on the second indication of user input that selects the one or more textual characters, that the one or more textual characters are correct; and
responsive to determining that the one or more textual characters are correct, outputting, by the computing device, for display, the one or more textual characters by replacing the second auto-complete word suggestion.

11. The method of claim 1, wherein the indication of user input that selects the one or more textual characters, the indication of user input that selects the end-of-word identifier, and the indication of user input that deletes the end-of-word identifier are each received at an input device comprising a presence-sensitive screen, the method further comprising:
outputting, by the computing device, for display at the presence-sensitive screen, a graphical keyboard comprising a plurality of keys, wherein the indication of user input that selects the one or more textual characters, the indication of user input that selects the end-of-word identifier, and the indication of user input that deletes the end-of-word identifier each comprise respective representations of selections of one or more of the plurality of keys.

12. The method of claim 1, wherein outputting the second auto-complete word suggestion comprises outputting, by the computing device, for display at a location of a presence-sensitive screen that corresponds to a portion of the presence-sensitive screen at which the first auto-complete word suggestion was displayed, the second auto-complete word suggestion.

13. The method of claim 1, wherein the indication of user input that selects the one or more textual characters, the indication of user input that selects the end-of-word identifier, and the indication of user input that deletes the end-of-word identifier comprise a single indication of a non-tap gesture detected at a location of a presence-sensitive screen.

14. The method of claim 1, further comprising:
determining, by the computing device, a highest probability auto-complete word suggestion of the plurality of auto-complete word suggestions that is most likely to be the correct word suggestion based on the one or more textual characters, wherein the first auto-complete word suggestion corresponds to the highest probability auto-complete word suggestion of the plurality of auto-complete word suggestions.

15. A non-transitory computer-readable storage medium encoded with instructions that, when executed, cause at least one processor of a computing device to:
after receiving, by the computing device, an indication of user input that selects one or more textual characters, receive an indication of user input that selects an end-of-word identifier;
determine, by the computing device, based at least in part on the one or more textual characters and in response to receiving the end-of-word identifier, a first auto-complete word suggestion from a plurality of auto-complete word suggestions, wherein the first auto-complete word suggestion is determined to be more likely to be a correct word suggestion than a second auto-complete word suggestion from the plurality of auto-complete word suggestions;
output, by the computing device, for display, the first auto-complete word suggestion that replaces the one or more textual characters followed by the end-of-word identifier;
receive, by the computing device, an indication of user input that deletes the end-of-word identifier, wherein the indication of user input that deletes the end-of-word identifier comprises a combination of a selection of both a backspace key and a spacebar key; and
responsive to receiving the indication of user input that deletes the end-of-word identifier, output, by the computing device, for display, the second auto-complete word suggestion, wherein the second auto-complete word suggestion replaces the first auto-complete word suggestion;
wherein the end-of-word identifier is a first end-of-word identifier and outputting the second auto-complete word suggestion comprises outputting, by the computing device, for display, the second auto-complete word suggestion followed by a second end-of-word identifier replacing the first auto-complete word suggestion and the first end-of-word identifier.

16. A computing system comprising:
at least one processor;
an input device and a display device each operatively coupled to the at least one processor; and
at least one module operable by the at least one processor to:
after receiving, at the input device, an indication of user input that selects one or more textual characters, receive, at the input device, an indication of user input that selects an end-of-word identifier;
determine, based at least in part on the one or more textual characters and in response to receiving the end-of-word identifier, a first auto-complete word suggestion from a plurality of auto-complete word suggestions, wherein the first auto-complete word suggestion is determined to be more likely to be a correct word suggestion than a second auto-complete word suggestion from the plurality of auto-complete word suggestions;
output, for display at the display device, the first auto-complete word suggestion that replaces the one or more textual characters followed by the end-of-word identifier;
receive, at the input device, an indication of user input that deletes the end-of-word identifier, wherein the indication of user input that deletes the end-of-word identifier comprises a combination of a selection of both a backspace key and a spacebar key; and
responsive to receiving the indication of user input that deletes the end-of-word identifier, output, for display at the display device, the second auto-complete word suggestion, wherein the second auto-complete word suggestion replaces the first auto-complete word suggestion;
wherein the end-of-word identifier is a first end-of-word identifier and outputting the second auto-complete word suggestion comprises outputting, by the computing device, for display, the second auto-complete word suggestion followed by a second end-of-word identifier replacing the first auto-complete word suggestion and the first end-of-word identifier.

17. The method of claim 1, wherein the indication of user input that selects the end-of-word identifier comprises a representation of a selection of a spacebar key and the indication of user input that deletes the end-of-word identifier comprises a representation of a selection of a backspace key after the selection of the spacebar key.

* * * * *